(12) United States Patent
Kucera et al.

(10) Patent No.: US 12,316,602 B2
(45) Date of Patent: May 27, 2025

(54) TRAFFIC MANAGEMENT IN DATA NETWORKS

(71) Applicant: Nokia Technologies Oy, Espoo (FI)

(72) Inventors: Stepan Kucera, Dublin (IE); Y. M. Khaled, Dublin (IE)

(73) Assignee: Nokia Technologies Oy, Espoo (FI)

( * ) Notice: Subject to any disclaimer, the term of this patent is extended or adjusted under 35 U.S.C. 154(b) by 951 days.

(21) Appl. No.: 16/651,086

(22) PCT Filed: Sep. 29, 2017

(86) PCT No.: PCT/FI2017/050688
§ 371 (c)(1),
(2) Date: Mar. 26, 2020

(87) PCT Pub. No.: WO2019/063869
PCT Pub. Date: Apr. 4, 2019

(65) Prior Publication Data
US 2020/0228492 A1    Jul. 16, 2020

(51) Int. Cl.
*H04L 61/5014*    (2022.01)
*H04L 9/30*    (2006.01)
(Continued)

(52) U.S. Cl.
CPC ............ *H04L 61/5014* (2022.05); *H04L 9/30* (2013.01); *H04L 45/24* (2013.01); *H04L 63/062* (2013.01);
(Continued)

(58) Field of Classification Search
CPC . H04L 9/30; H04L 45/24; H04L 45/70; H04L 45/306; H04L 47/14; H04L 47/193;
(Continued)

(56) References Cited

U.S. PATENT DOCUMENTS 7,305,489 B2 * 12/2007 Puthiyandyil ..... H04L 29/12009
709/245
7,461,251 B2 * 12/2008 Oishi ................ H04L 29/12009
713/156
(Continued)

FOREIGN PATENT DOCUMENTS

CN    103004167 A    3/2013
CN    106233691 A    12/2016
EP    1916822 A1    4/2008

OTHER PUBLICATIONS

Office action received for corresponding European Patent Application No. 17787464.1, dated Nov. 16, 2021, 6 pages.
(Continued)

*Primary Examiner* — Walter J Divito
(74) *Attorney, Agent, or Firm* — Tong, Rea, Bentley & Kim, LLC

(57) ABSTRACT

A method and system is disclosed for traffic management in data networks. A first operation comprises allocating a first IP address to a first interface of a client device for data communications using a first sub-flow over a first path. Another operation comprises allocating a second IP address to a second interface of the client device for data communications using a second sub-flow over a second, different path, the second IP address being associated with the first IP address. Another operation comprises sending information relating to the allocated first and second IP addresses for the client device to an aggregating device for aggregating the first and second sub-flows, when received from the client device, for providing aggregated data to a destination device.

20 Claims, 9 Drawing Sheets

(51) Int. Cl.
  *H04L 9/40* (2022.01)
  *H04L 45/24* (2022.01)
  *H04L 101/677* (2022.01)
  *H04W 40/00* (2009.01)

(52) U.S. Cl.
  CPC ....... *H04W 40/00* (2013.01); *H04L 2101/677* (2022.05)

(58) Field of Classification Search
  CPC ............. H04L 61/2015; H04L 61/6077; H04L 63/062; H04L 69/14; H04W 12/0431; H04W 36/22; H04W 28/0231; H04W 40/00; H04W 72/04; Y02D 30/50; Y02D 30/70
  See application file for complete search history.

(56) References Cited

U.S. PATENT DOCUMENTS

| | | | | |
|---|---|---|---|---|
| 7,869,593 | B2* | 1/2011 | Beeson | H04L 9/321 380/30 |
| 8,560,663 | B2* | 10/2013 | Baucke | G06F 9/45558 709/223 |
| 9,455,897 | B2* | 9/2016 | Krishnaswamy | H04L 69/165 |
| 10,142,965 | B2* | 11/2018 | Kanugovi | H04W 76/15 |
| 2006/0047826 | A1* | 3/2006 | Cromer | H04L 29/12009 709/229 |
| 2013/0024553 | A1 | 1/2013 | Mittal et al. | |
| 2014/0304765 | A1* | 10/2014 | Nakamoto | H04L 63/20 726/1 |
| 2017/0142233 | A1 | 5/2017 | Boucadair et al. | |

OTHER PUBLICATIONS

Kanugovi et al., "Multiple Access Management Protocol draft-kanugovi-intarea mams-protocol-00", IETF Internet Draft, Jul. 17, 2016, pp. 1-10.

"Diffie-Hellman Key Exchange" in Plain English, StackExchange, Retrieved on Mar. 23, 2020, Webpage available at : https://security.stackexchange.com/questions/45963/diffie-hellman-key-exchange-in-plain-english.

International Search Report and Written Opinion received for corresponding Patent Cooperation Treaty Application No. PCT/FI2017/050688, dated Jun. 19, 2018, 12 pages.

Ford et al., "TCP Extensions for Multipath Operation with Multiple Addresses", RFC 6824, Internet Engineering Task Force (IETF), Jan. 2013, pp. 1-64.

Summons to Oral Proceedings received for corresponding European Patent Application No. 17787464.1, dated Nov. 21, 2022, 7 pages.

Office action received for corresponding Chinese Patent Application No. 201780097273.4, dated Dec. 31, 2021, 8 pages of office action and No. page of translation available.

* cited by examiner

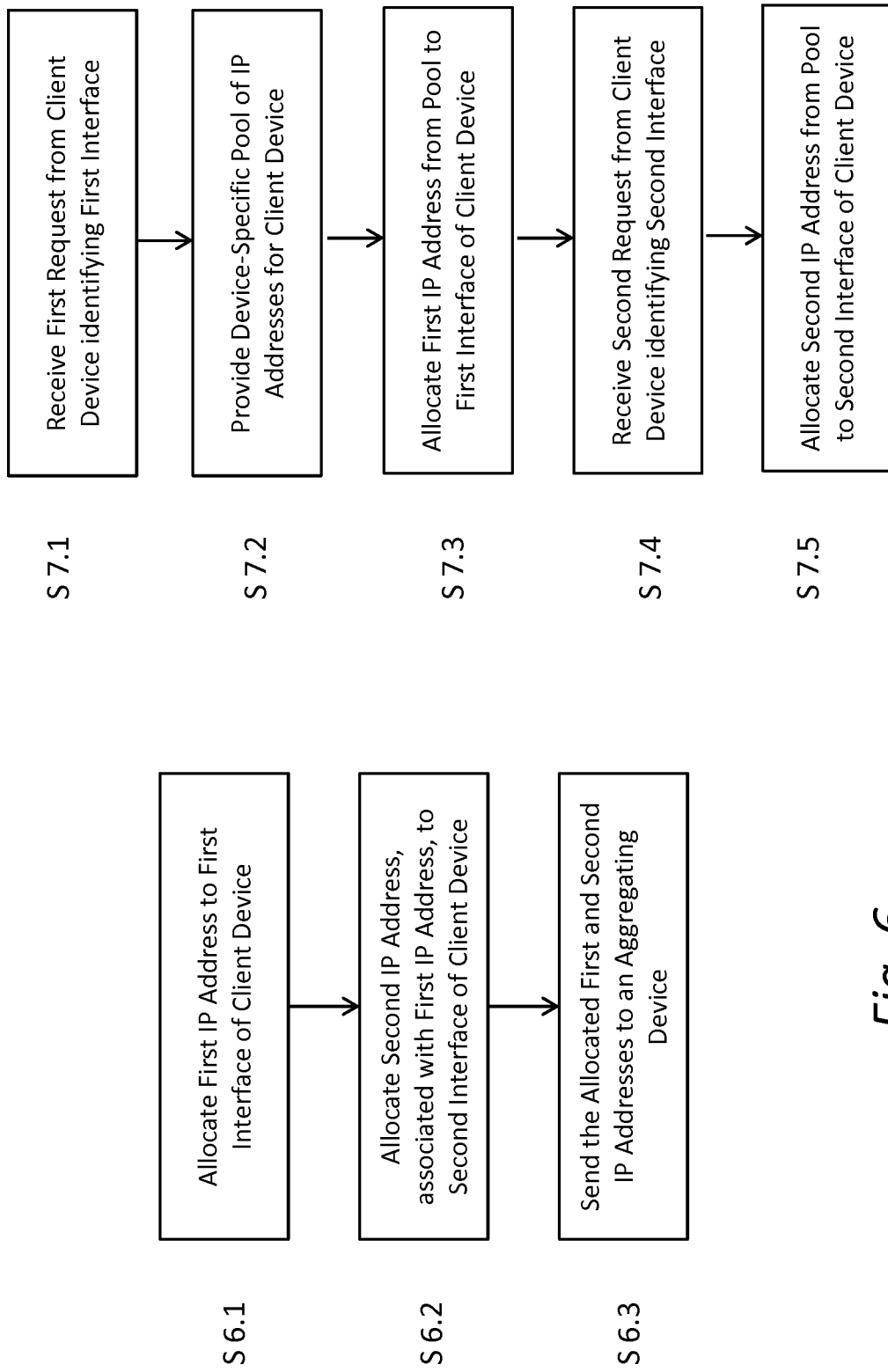

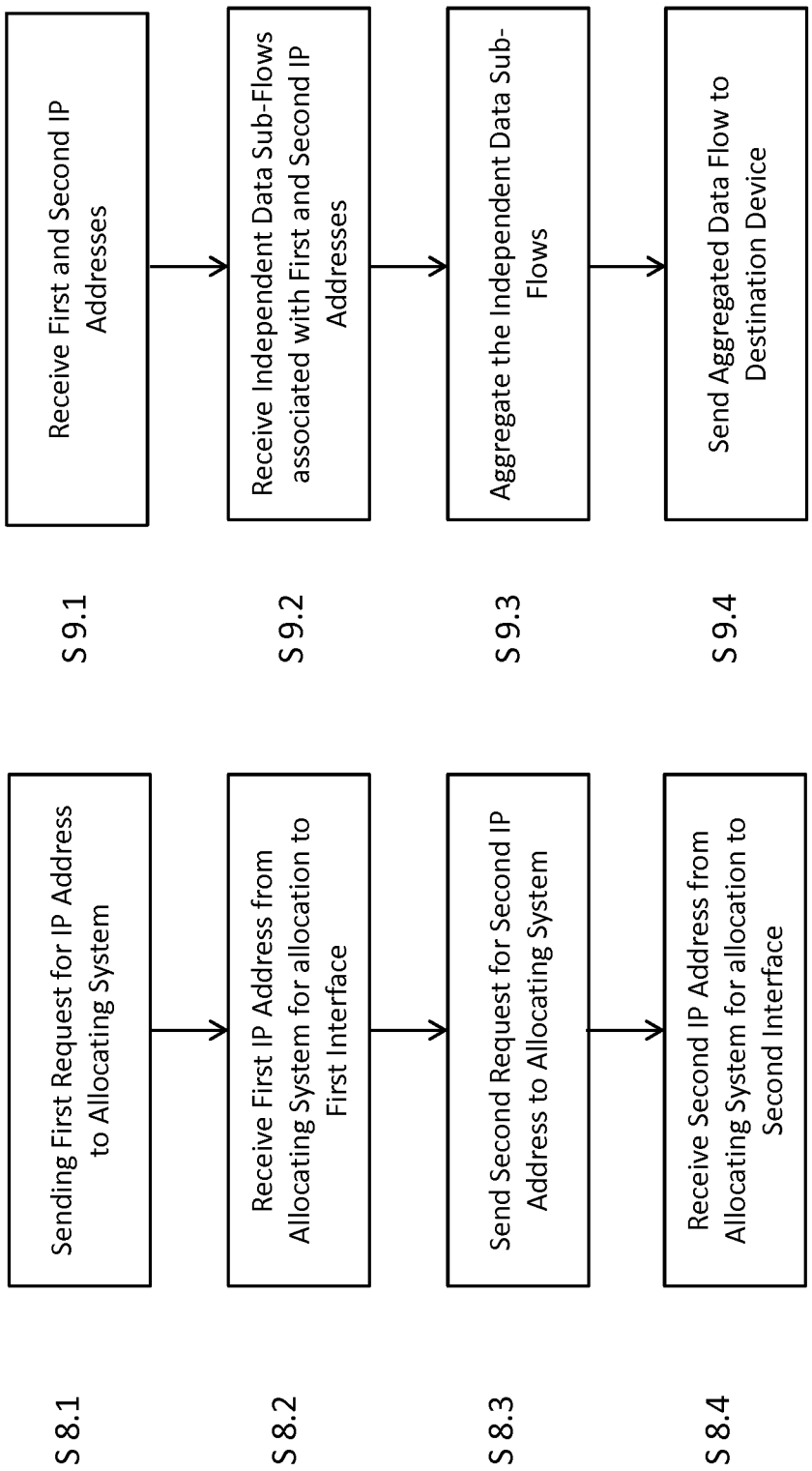

TRAFFIC MANAGEMENT IN DATA NETWORKS

RELATED APPLICATION

This application claims priority to PCT Application No. PCT/FI2017/050688, filed on Sep. 29, 2017, each of which is incorporated herein by reference in its entirety.

FIELD

This disclosure relates to traffic management in data networks.

BACKGROUND

To meet capacity versus cost requirements of wireless networks, for example next-generation wireless networks, standardization bodies such as 3GPP, IEEE and IETF have been focussing on technologies for multiple-path (multi-path) wireless communications. Multi-path wireless communications refers to using multiple radio access technologies (RATs) for simultaneously delivering a single data flow over multiple wireless links, or paths, in parallel.

Multi-path wireless communications is attractive for a number of reasons.

For example, the aggregation of multiple independent data delivery paths into one logical connection increases overall throughput, as well as reducing latency. Resource pooling and multiplexing may be employed for this purpose. Inter-RAT bandwidth aggregation is not limited by per-RAT spectrum availability.

Multi-path wireless communications enable control of a wireless quality of service (QoS); temporary bandwidth outages may for example be masked out by using adaptive link multiplexing. End-to-end latency may be controlled using redundancy encoding in the form of packet-level forward error correction (FEC.)

Multi-path wireless communications allow operators to efficiently re-use existing multi-band, multi-technology infrastructure and offer high-speed connections without incurring significant costs associated with the roll-out of new, high-performance networks.

However, traffic management of multi-path data flows is difficult because management entities cannot use current packet inspection techniques to identify data flows belonging to the same multi-path connection or even just the same device. If one packet or data flow is misdirected, the connection is interrupted and may fail completely.

SUMMARY

A first aspect provides a method comprising: allocating a first IP address to a first interface of a client device for data communications using a first sub-flow over a first path; allocating a second IP address to a second interface of the client device for data communications using a second sub-flow over a second, different path, the second IP address being associated with the first IP address; and sending information relating to the allocated first and second IP addresses for the client device to an aggregating device for aggregating the first and second sub-flows, when received from the client device, for providing aggregated data to a destination device.

The method may further comprise allocating one or more further IP addresses to respective further interfaces of the client device for data communications using respective further sub-flows over respective different paths, the further IP addresses being associated with the first and second IP addresses, and sending information relating to the further IP addresses for the client device to the aggregating device.

The first and second sub-flows may be associated with the same connection.

The first and second sub-flows may be for transmission over respective, different networks using respective technologies.

The first and second IP addresses may be allocated from a device-specific pool of IP addresses associated with the client device.

The first IP address may be allocated responsive to a first request from the client device, and the second IP address is allocated responsive to a second request from the client device, the method further comprising identifying, or deriving, an association key from the second request, which association key identifies or generates the device-specific pool of IP addresses from which the second IP address is allocated.

The method may further comprise generating a first association key responsive to the first request and sending information to the client device for the client device to generate a corresponding first association key identifiable or derivable from the second request from the client device.

The first association key may be a shared secret.

The association key may not be transmitted to the aggregating device and/or the destination device.

The first association key may be generated by: receiving a public key A from the client device; computing a local public key B; and generating a local first association key S based on the received public key A and the local public key B.

The public key A may be received from the client device with an identifier of the first interface of the client device, the method further comprising associating the first IP address with the first interface identifier.

The first interface identifier may be a MAC address of the first interface.

The method may further comprise: sending the local public key B to the client device for generating a comparison first association key S.

The method may further comprise, responsive to receiving the second request, generating a second association key, linked to the first association key, and sending information to the client device for the client device to generate a corresponding second association key identifiable or derivable from a subsequent request from the client device.

The second association key may be a shared secret.

The second association key may be generated by: receiving the first association key S and a new public key C from the client device; identifying a correspondence between the local first association key S and the received first association key S; computing a new public key D; and generating a local second association key T, linked to the first association key S based on the received public key C and the local public key D.

The public key C may be received from the client device with an identifier of the second interface of the client device, the method further comprising associating the second IP address with the first interface identifier.

The second interface identifier may be a MAC address of the second interface.

The method may further comprise, responsive to receiving a further request, generating a further association key, linked to the first and second association keys, and sending information to the client device for the client device to generate a corresponding further association key to the client device identifiable or derivable from a subsequent request from the client device.

The local public key(s) may be computed based on a private key generated.

The first IP address may be allocated responsive to a first request from the client device and wherein the device-specific pool of IP addresses comprises a chain of one or more further IP addresses, associated with the first IP address.

One or more of the first and second IP addresses may have an associated expiry time, the method further comprising receiving a renewal request from the client device comprising at least one of the first and second IP addresses and making a renewal determination based thereon.

The renewal request may further comprise a MAC address of the first and/or the second interface.

The method of any preceding definition may be performed at a DHCP server.

A second aspect provides a method comprising: at a client device comprising first and second interfaces: sending a first request for a first IP address to an allocating system; receiving information relating to a first IP address from the allocating system, the first IP address being allocated to the first interface for data communications using a first sub-flow over a first path; sending a second request for a second IP address to the allocating system; receiving information relating to a second IP address from the allocating system, the second IP address being allocated to the second interface for data communications using a second sub-flow over a second path.

The method may further comprise: sending one or more further requests for respective further IP addresses to the allocating system; receiving information relating to one or more respective IP addresses from the allocating system, the IP addresses being allocated to respective further interfaces for data communications using further sub-flows over further paths.

The first and second sub-flows may be associated with the same connection between the client device and a destination device.

The first and second sub-flows may be for transmission over respective, different networks.

The first and second sub-flows may be for transmission using any two of networks conforming to 3GPP and/or IEEE standards.

The first and second sub-flows may be for transmission using any two of: WiFi, WIGIG, 3G, CDMA, 4G, LTE, 5G, DMS.

The second request may comprise an association key.

A first association key may be generated in response to a message from the allocating device in response to the first request.

The first association key may be a shared secret.

The first association key may be generated by: receiving a public key B from the allocating device; and generating a comparison first association key S based on a computed local public key A and the received public key B.

The public key A may be sent to the allocating device with an identifier of the first interface.

The first interface identifier may be a MAC address of the first interface.

The method may further comprise, responsive to sending the second request, receiving information for generating a second association key, linked to the first association key, in a message from the allocating device.

The second request may comprise the comparison first association key S and a new public key C.

The new public key C may be sent with an identifier of the second interface.

The second interface identifier may be a MAC address of the second interface.

The public key(s) may be computed based on a private key.

The first IP address may be allocated responsive to the first request from the client device and wherein the device-specific pool of IP addresses comprises a chain of one or more further IP addresses, associated with the first IP address.

One or more of the first and second IP addresses may have an associated expiry time, the method further comprising sending a renewal request to the allocating device comprising at least one of the first and second IP addresses.

The renewal request may comprise a MAC address of the first and/or the second interface.

A third aspect provides a computer program comprising instructions that when executed by a computer program control it to perform the method of any preceding definition.

A fourth aspect provides a non-transitory computer-readable storage medium having stored thereon computer-readable code, which, when executed by at least one processor, causes the at least one processor to perform a method, comprising: allocating a first IP address to a first interface of a client device for data communications using a first sub-flow over a first path; allocating a second IP address to a second interface of the client device for data communications using a second sub-flow over a second, different path, the second IP address being associated with the first IP address; and sending information relating to the allocated first and second IP addresses for the client device to an aggregating device for aggregating the first and second sub-flows, when received from the client device, for providing aggregated data to a destination device.

A fifth aspect provides an apparatus, the apparatus having at least one processor and at least one memory having computer-readable code stored thereon which when executed controls the at least one processor: to allocate a first IP address to a first interface of a client device for data communications using a first sub-flow over a first path; to allocate a second IP address to a second interface of the client device for data communications using a second sub-flow over a second, different path, the second IP address being associated with the first IP address; and to send information relating to the allocated first and second IP addresses for the client device to an aggregating device for aggregating the first and second sub-flows, when received from the client device, for providing aggregated data to a destination device.

A sixth aspect provides a non-transitory computer-readable storage medium having stored thereon computer-readable code, which, when executed by at least one processor, causes the at least one processor to perform a method, comprising: at a client device comprising first and second interfaces: sending a first request for a first IP address to an allocating system; receiving information relating to a first IP address from the allocating system, the first IP address being allocated to the first interface for data communications using a first sub-flow over a first path; sending a second request for a second IP address to the allocating system; receiving information relating to a second IP address from the allocating system, the second IP address being allocated to the second interface for data communications using a second sub-flow over a second path.

A seventh aspect provides an apparatus, the apparatus having at least one processor and at least one memory having computer-readable code stored thereon which when executed controls the at least one processor: at a client device comprising first and second interfaces: to send a first request for a first IP address to an allocating system; receiving information relating to a first IP address from the allocating system, the first IP address being allocated to the first interface for data communications using a first sub-flow over a first path; to send a second request for a second IP address to the allocating system; to receive information relating to a second IP address from the allocating system, the second IP address being allocated to the second interface for data communications using a second sub-flow over a second path.

An eighth aspect provides an apparatus configured to perform the method of any of preceding method definition.

BRIEF DESCRIPTION OF THE DRAWINGS

Example embodiments will now be described by way of non-limiting example with reference to the accompanying drawings, in which:

FIG. 6 is a flow diagram indicating operations performed at an allocating device according to an example embodiment;

FIG. 7 is a flow diagram indicating more detailed operations performed at an allocating device according to an example embodiment;

FIG. 8 is a flow diagram indicating operations performed at a client device according to an example embodiment;

FIG. 9 is a flow diagram indicating operations performed at an aggregating device according to an example embodiment;

DETAILED DESCRIPTION OF PREFERRED EMBODIMENTS

Figure 1:
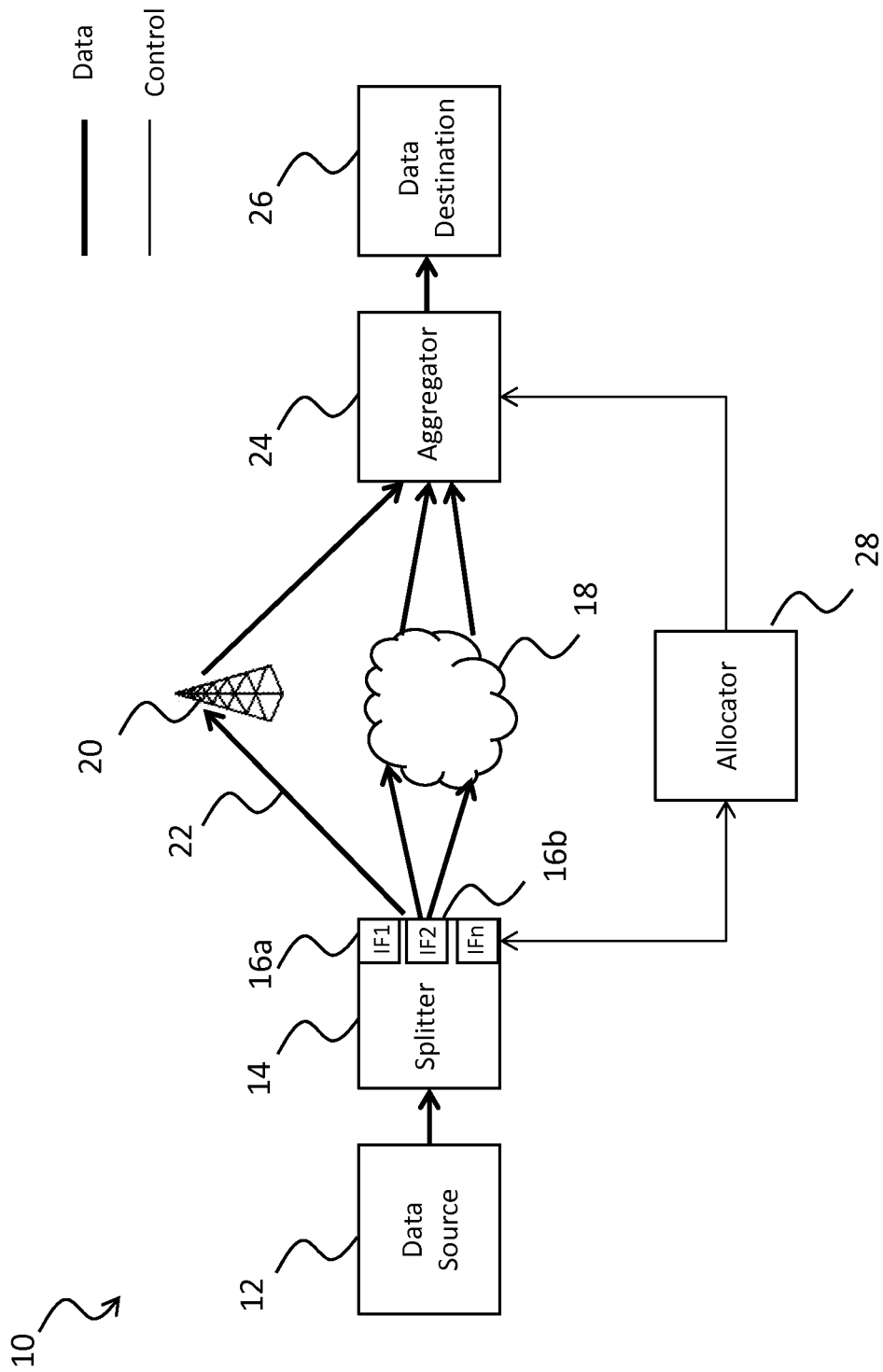
FIG. 1 is a block diagram of a multi-path network architecture according to an example embodiment.

Embodiments herein relate to traffic management in data networks, for example in multi-path networks and/or in multi-path routing.

In multi-path networks, data may be routed using multiple alternative paths through a network, or multiple networks, which may yield a variety of benefits including load balancing, fault tolerance and improved security. Each path may be independent. Each path may be referred to as a sub-flow or sub-path, e.g. relating to a flow of data packets sharing a common property, for example the endpoint of the flow.

The flow of data packets may be for a particular connection, i.e. from a given source address to a given destination or target address. The source, or a separate module associated with the source, may divide the flow of data packets for the connection into separate independent sub-flows. The destination, or a separate module associated with the destination, may then combine the sub-flows for the destination to receive.

The sub-flows or sub-paths may use different communications technologies; for example a first sub-flow may use a wired IP link and a second sub-flow may employ a third, fourth or fifth generation (3/4/5G) cellular network. Thus, different user equipment (UE) communications interfaces may be employed for the separate sub-flows.

Typically, IP traffic management entities process data flows based on the IP header 5-tuple of received packets which describes a TCP connection. The 5-tuple consists of five elements, being (i) source IP address, (ii) source port, (iii) target IP address, (iv) target port and (v) protocol. However, in multi-path networks, the IP information of independent sub-flows is unrelated because the sub-flows may be transported over different independent networks. Hence IP traffic management entities cannot use conventional packet inspection techniques to identify sub-flows relating to the same multi-path connection or even the same device. If one packet or sub-flow of a multi-path connection is misdirected, the connection may be interrupted and/or fail entirely.

An advantageous use of multi-path networks may be illustrated by Long Term Evolution (LTE) and WiFi aggregation. In uncongested conditions, WiFi may be used on both the uplink and downlink for connecting to enterprise applications. In congested conditions, the use of the WiFi uplink may lead to seriously degraded downlink WiFi capacity and increased delays due to contention in the non-scheduled medium access layer. This may be avoided, for example, by redirecting uplink traffic to a LTE uplink, i.e. using combined WiFi downlink access and LTE uplink access.

Embodiments herein involve using an allocating module for allocating multiple network level addresses, e.g. IP addresses, to requesting UE interfaces of a common UE or common source entity initiating a connection. The common source entity may be a splitter module, e.g. a network layer (3) splitter which may have an associated client application.

The UE interfaces may be independent of one another for invoking independent sub-flows. The UE interfaces may relate to different networking technologies, e.g. WiFi, 3G, 4G, 5G and indeed any wired or wireless communication technology, including future technologies.

The allocating module may provide the allocated IP addresses to a separate module at or associated with the destination device. The allocating module may further advertise that the allocated IP addresses are device-specific, i.e. they are associated with the same data source. The separate module may be termed an aggregator; its role is to receive the advertised IP addresses in order to determine that sub-flows associated with these IP addresses are related and to combine the sub-flows for the destination device.

The allocating module may be a Dynamic Host Configuration Protocol (DHCP) server or any other module configured to operate in generally the same way.

Embodiments also provide a protocol for keeping track of how IP addresses are associated with the UE interfaces. The protocol may be backwards compatible.

FIG. 1 shows an example network architecture 10 according to a first embodiment. The architecture 10 comprises a data source 12, a splitter 14 having a plurality of communications interfaces 16a, 1613, a first IP network 18, a second IP network 20, a destination aggregator 24, a data destination 26, and an allocator 28.

The data source 12 and data destination 26 may comprise any form of communications terminal for transmitting and/or receiving data packets. For example, the data source 12 and data destination 26 may each be one of a computer terminal, a mobile telephone, a smartphone, a laptop, a tablet computer or indeed any form of terminal with data communications capability. The data source 12 and data destination 26 may be a form of customer premises equipment (CPE) or a virtual multi-X host.

The splitter 14 may be any form of processing module associated with the data source 12; the splitter may form a part of the data source. The splitter 14 may for example be a hardware, software and/or firmware module within the data source 12. The hardware, software and/or firmware of the splitter 14 may be configured to perform the operations to be described below, for example by means of a processor, controller, plural processors or controllers, in association with RAM, one or more software applications stored on memory (e.g. a hard disk drive or removable memory module). In some cases, the one or more software applications may be cloud-based applications stored on a remote memory device and accessed by the splitter 14. In embodiments herein, the splitter 14 operates at the network level 3. The splitter 14 may be a virtual splitter or a physical splitter.

Within the splitter 14 may be a first communications interface (IF1) 16a which may be associated with over-the-air cellular communications. For example, the first communications interface 16a may comprise a 3/4/5G communications interface for data communications via one or more eNB base stations 20 associated with a cellular network. A second communications interface (IF2) 16b may be associated with internet communications via a fixed-line telephone network 18. Third and fourth communications interfaces (IFn) may also be provided.

The aggregator 24 may be any form of processing module associated with the data destination 26; the aggregator may form part of the data destination. The aggregator 24 may for example be a hardware, software and/or firmware module within the data destination 26. The hardware, software and/or firmware of the aggregator 24 may be configured to perform the operations to be described below, for example by means of a processor, controller, plural processors or controllers, in association with RAM, one or more software applications stored on memory (e.g. a hard disk drive or removable memory module). In some cases, the one or more software applications may be cloud-based applications stored on a remote memory device and accessed by the aggregator 24. In embodiments herein, the aggregator 24 operates at the network layer 3 (L3). The aggregator 24 may be a virtual aggregator or a physical aggregator.

The allocator 28 may be any form of processing module; the allocator may form part of a network service. The allocator may for example be a hardware, software and/or firmware module. The hardware, software and/or firmware of the allocator 28 may be configured to perform the operations to be described below, for example by means of a processor, controller, plural processors or controllers, in association with RAM, one or more software applications stored on memory (e.g. a hard disk drive or removable memory module). In some cases, the one or more software applications may be cloud-based applications stored on a remote memory device and accessed by the allocator 28. In embodiments herein, the allocator 28 may be a DHCP server for multi-connectivity.

In overview, the allocator 28 is configured to assign IP addresses to the communications interfaces 16a, 1613 associated with the data source 12 from a pool of IP addresses associated with that data source. There may be a mapping between the pool and the data source 12. The pool may be assigned when the request for a first IP address is received, and released when the connection is terminated. Below is described an example protocol, based on DHCP, for allocating IP addresses from such a pool using shared secrets. Another option is to provide an IP chain association.

The data source 12 may store an identifier of the mapping or the pool, which may be in the form of an association key, for keeping track of interfaces that have joined the association. The association key may be a shared secret between the allocator 28 and the data source 12. For example, the association key may be provided using a standard shared secret algorithm such as the Diffie-Hellman algorithm for generating and/or updating the association key at both the data source 12 and the allocator 28 when a new IP address is associated to a new communications interface. Malicious network users may therefore be prevented from associating their own IP and MAC addresses with other users or devices for hijacking their traffic.

A more specific example will now be described with reference to FIG. 2.

Figure 2:
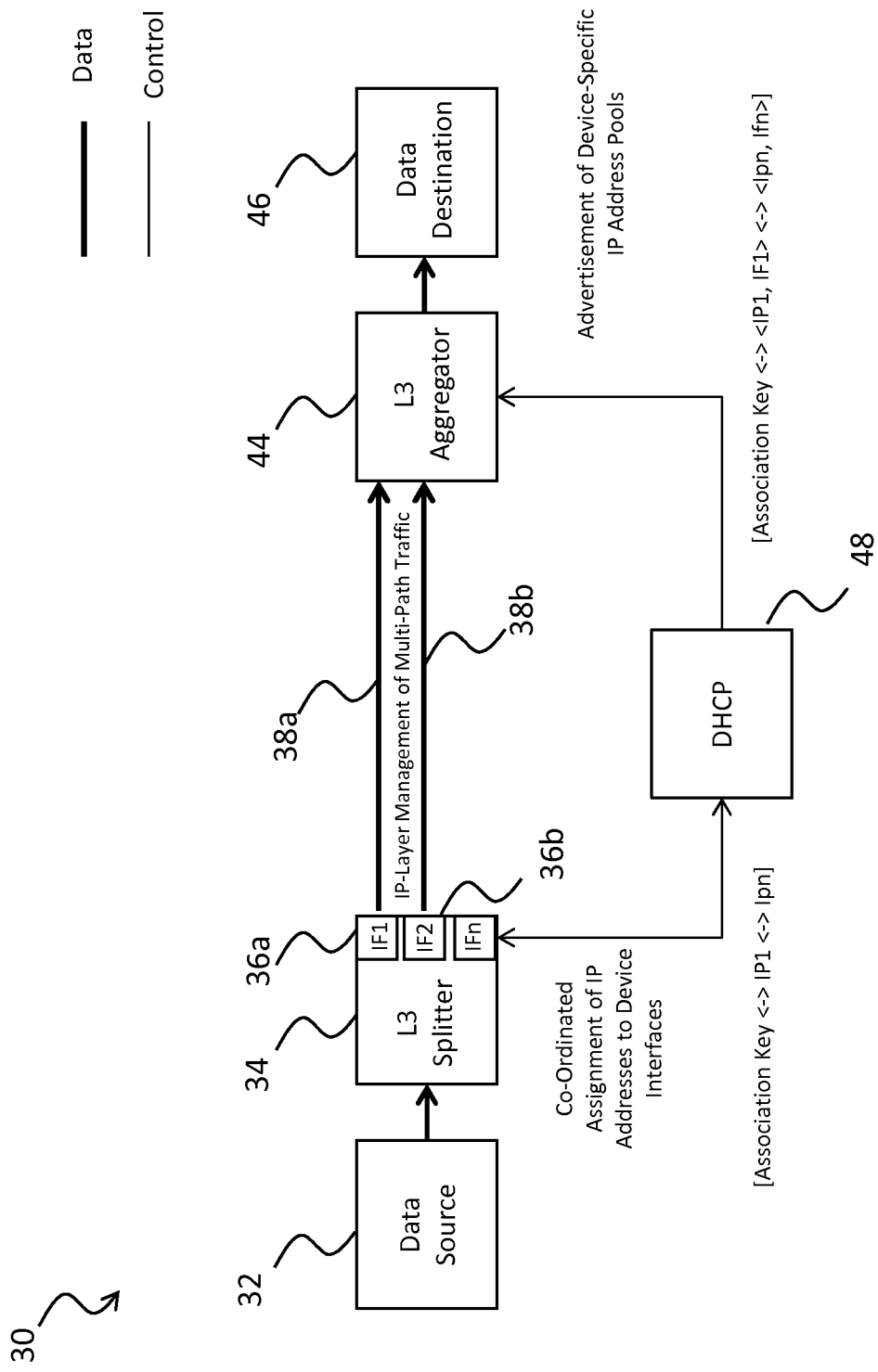
FIG. 2 is a block diagram of a multi-path network architecture according to another example embodiment.

FIG. 2 shows an example network architecture 30 according to a further embodiment. The architecture 30 comprises a data source 32, and an L3 splitter 34 having a plurality of communications interfaces 36a, 36b. The data source 32 may comprise any form of communications terminal for transmitting and/or receiving IP data packets. For example, the data source 32 may be one of a computer terminal, a mobile telephone, a smartphone, a laptop, a tablet computer or indeed any form of terminal with data communications capability. The data source 12 may be a form of customer premises equipment (CPE) or a virtual multi-X host.

The first interface 36a is for communicating data over a first IP sub-flow 38a and the second interface 26b is for communicating data over a second IP sub-flow 38b to a data destination 46. The first and second IP sub-flows are independent of one another and may use different networks and/or communications technologies. The first sub-flow 38a may use a cellular interface 36a for communicating over-the-air with an eNB base station whereas the second sub-flow 38b may use a WiFi interface 36b for communicating with a local router connected to the exchange of a fixed telecommunications provider.

The data destination 46 may comprise any form of communications terminal for transmitting and/or receiving IP data packets. For example, the data destination 46 may be one of a computer terminal, a mobile telephone, a smartphone, a laptop, a tablet computer or indeed any form of terminal with data communications capability. The data destination 26 may be a form of customer premises equipment (CPE) or a virtual multi-X host.

A DHCP 48 is provided remotely from the data source 32 and the data destination 46 for allocating IP addresses for the respective interfaces 36a, 36b and their respective sub-flows 38a, 38b. The DHPC 48 is also configured to transmit the allocated IP addresses for the respective interfaces 36a, 36b to an L3 aggregator 44.

The L3 aggregator 44 is associated with the data destination 46 and corresponds with the aggregator 24 mentioned above.

The L3 splitter 34 comprises a software application which is a DHCP client application. The DHCP client application is for bi-directional communication of control data with the DHCP 48.

Figure 3:
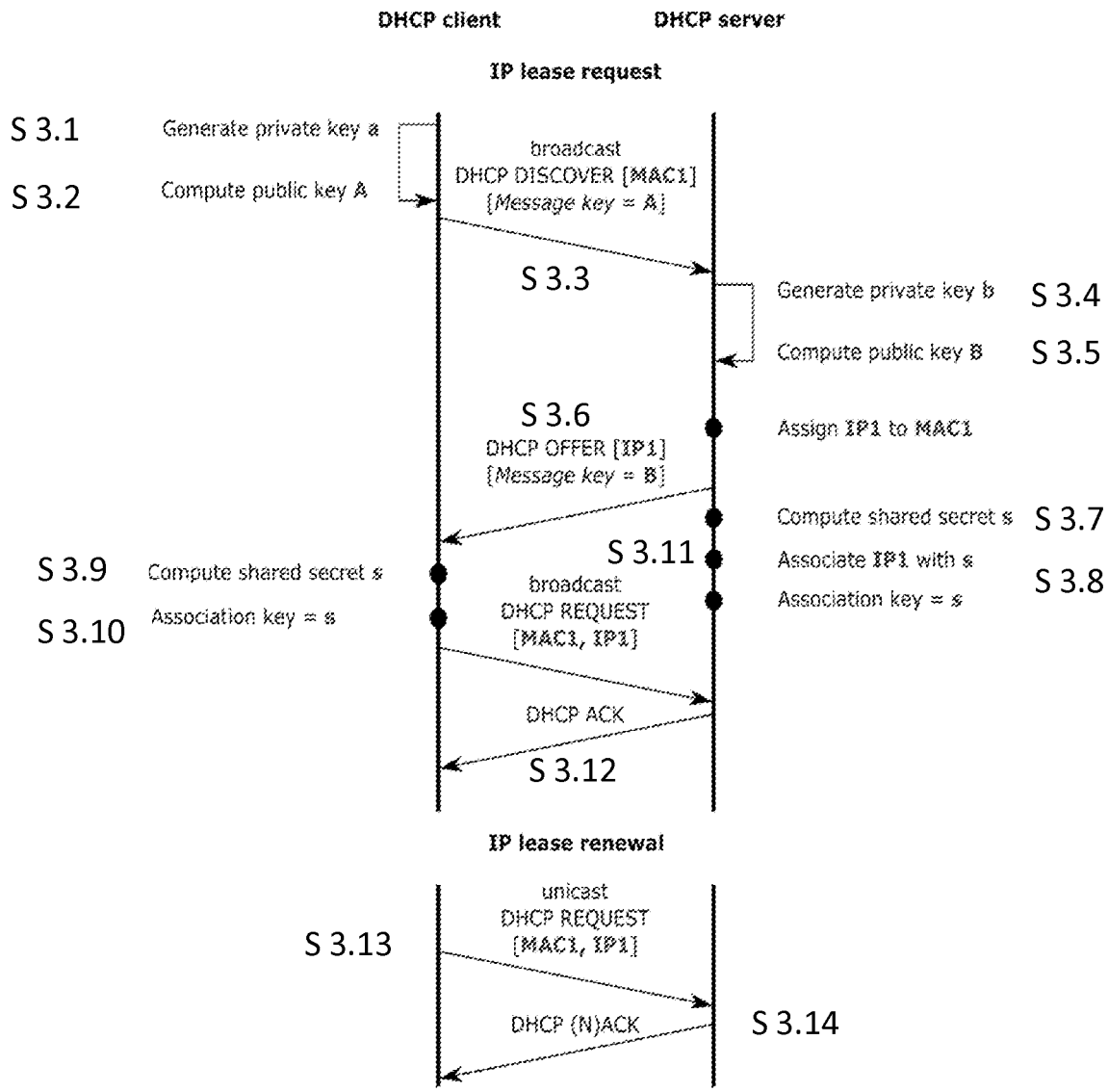
FIG. 3 is a flow diagram indicating generation and exchange of control data between a client device and an allocating device for allocating a first IP address according to an example embodiment.

FIG. 3 is a flow diagram illustrating an example algorithm that may be performed by the DHCP client application of the L3 splitter 34 and also by the DHCP 48.

Initially, when a user wishes to use the first communications interface 36a, said interface is activated and commences an IP address request from the DHCP 48.

A first operation S3.1 comprises the DHCP client of the L3 splitter 34 generating a private key "a". This may be performed using two publicly known prime numbers "p" and "g" or any similar method. In an operation S3.2, the DHCP client of the L3 splitter 34 generates from the private key "a" a corresponding public key "A". The public key "A" may be generated using A=g^a mod p. In an operation S3.3, the DHCP client of the L3 splitter 34 broadcasts, or otherwise transmits, a DHCP DISCOVER request to lease an IP address to the DHCP 48. This DHCP DISCOVER request comprises the MAC address "MAC1" of the first interface 36a and the public key "A" in clear text which may also be termed a first message key.

Responsive to receiving the DHCP DISCOVER REQUEST from the DHCP client of the L3 splitter 34, the DHCP 48 generates its own private key "b" in an operation S3.4 using the aforementioned prime numbers "p" and "g" and then subsequently computes a corresponding public key "B" in an operation S3.5. The public key "B" may be generated using B=g^b mod p. The public key "B" may also be termed a second message key. This may be performed in accordance with the legacy DHCP protocol.

The DHCP 48 at this stage may assign or allocate a first IP address IP1 to the first interface 36a, i.e. by mapping it to its MAC address MAC1. In an operation S3.6 a DHCP OFFER message is sent with the allocated IP address IP1 and the second message key B. The DHCP 48 may in another operation S3.7 compute a shared secret "S" using an algorithm such as S=A^b mod p. The DHPC 48 may in another operation S3.8 associate the allocated IP address IP1 to "S."

The value of "S" is termed the "Association key" at the DHCP 48.

Responsive to receiving the DHCP OFFER message from the DHCP 48, in an operation S3.9 the DHCP client of the L3 splitter 34 computes its own shared secret "S" which should correspond to that computed by the DHCP 48. This is computed using a corresponding algorithm such as S=B^a mod p. The shared secret "S" is stored as an Association key in an operation S3.10.

The shared secret "S" generated at the DHCP 48 may be referred to as "S1" and that generated at the DHCP client of the L3 splitter 34 as "S2" for ease of reference.

The DHCP client of the L3 splitter 34 may accept the DHCP OFFER in an operation S3.11 by broadcasting or otherwise sending a DHCP REQUEST message comprising the MAC address MAC1 and IP1 back to the DHCP 48. The DHCP 48 may acknowledge the acceptance in a further DHCP ACK message in an operation S3.12.

Also shown in FIG. 3 is the process of IP lease renewal. In this respect, when an entity leases an IP address from the DHCP 48, it will have an associated expiry time. Once expiry occurs, in an operation S3.13 the DHCP client of the L3 splitter 34 may send a direct unicast request for IP address renewal to the DHCP 48, including the MAC address MAC1 and the allocated IP address needing renewal, i.e. IP1. The DHCP 48 may automatically renew the lease for the IP address IP1 based on the implicit authentication of the L3 splitter 34 using MAC1 and IP1. In such a situation, an ACK message may be sent in an operation S3.14.

In some situations, the DHCP 48 may wish to allocate a different IP address in which case it may deny the lease renewal request in operation S3.14 with a NACK message. In such case, the previous steps may need to be repeated in order to acquire the new IP address. The DHCP client of the L3 splitter 34 may also be required to request a new lease if the DHCP 48 replies with the public key "B" in the DHCP NACK message.

Generally speaking, it may be noted that there is no need to exchange the secret keys "S" and hence the association chain does not need to be renewed in case the exchange fails and "S" becomes invalidated. This is particularly advantageous when multiple interfaces are activated.

Figure 4:
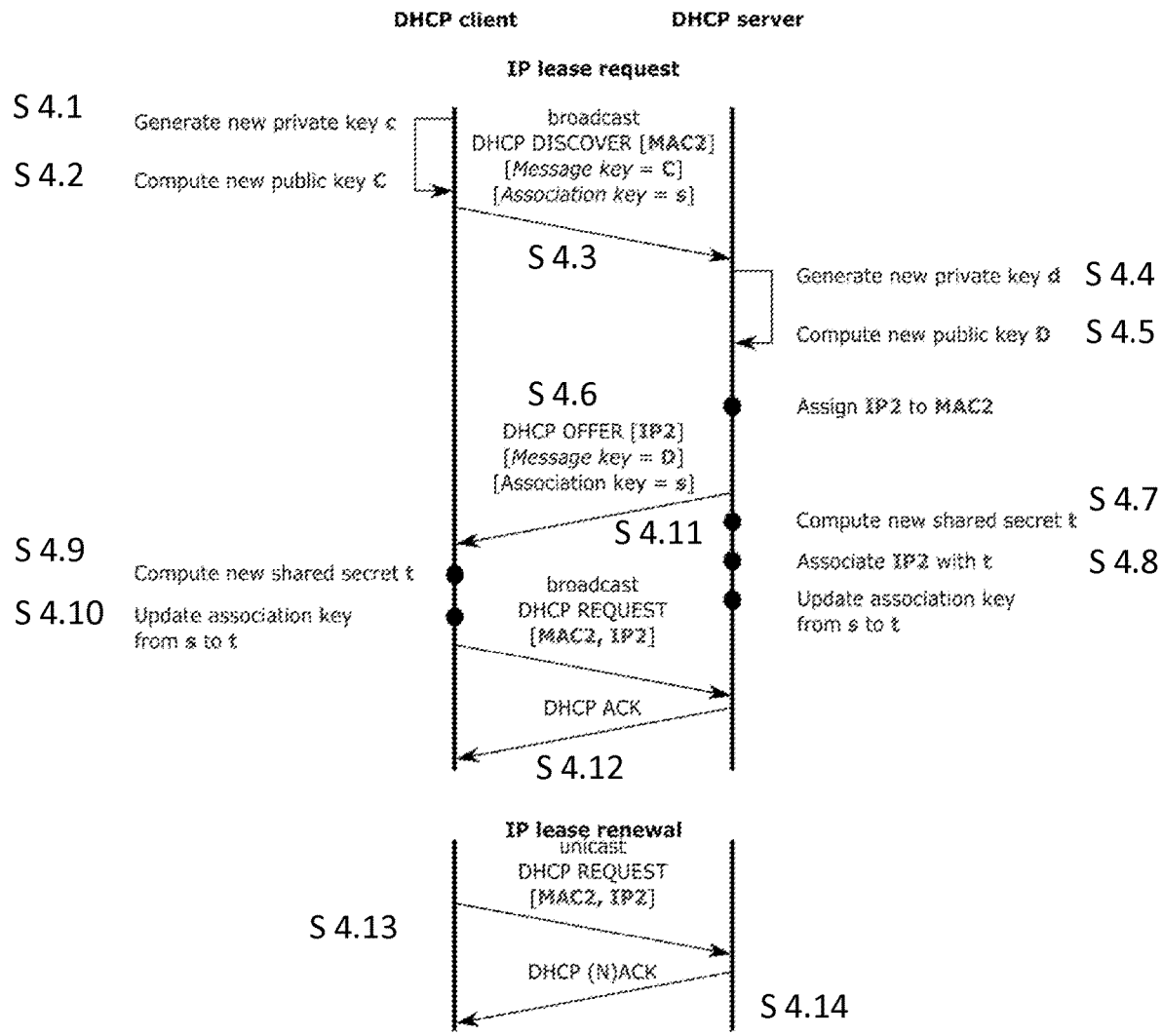
FIG. 4 is a flow diagram indicating generation and exchange of control data between the client device and the allocating device for allocation of a further IP address according to an example embodiment.

FIG. 4 is a flow diagram illustrating an example algorithm that may be performed by the DHCP client application of the L3 splitter 34 and the DHCP 48 for acquiring a subsequent IP address for the same data source 32 and L3 splitter 34.

In general, the same or similar procedure used in the FIG. 3 flow diagram is employed for a second communications interface 36b to obtain a second IP address (and so on for further communications interfaces IFn). A notable difference is that the association key S is added to the DHCP DISCOVER message so that the DHCP 48 may identify that an IP address associated with the same data source 32 or L3 splitter 34 is needed.

A first operation S4.1 may comprise the DHCP client of the L3 splitter 34 generating a new private key "c" using new prime numbers. A further operation S4.2 may comprise computing a new corresponding public key "C" using the previous method. A further operation S4.3 comprises the DHCP client of the L3 splitter 34 broadcasting, or otherwise transmitting, a DHCP DISCOVER request to lease an IP address to the DHCP 48. The DHCP DISCOVER request comprises the MAC address "MAC2" of the second interface 36b, the new message key "C" and also the association key "S" resulting from the previous lease request.

Responsive to receiving the DHCP DISCOVER REQUEST from the DHCP client of the L3 splitter 34, the DHCP 48 generates its own new private key "d" in an operation S4.4 using the prime numbers used by the DHCP client in operation S4.1 and then subsequently computes a corresponding public key "D" in an operation S4.5. This may be performed in accordance with the legacy DHCP protocol.

The DHCP 48 at this stage may assign or allocate a second IP address IP2 to the second interface 36b, i.e. by mapping it to its MAC address MAC2 to IP2. The second IP address IP2 is allocated from a pool or chain of IP addresses associated with the DHCP client in the previous operation of allocating IP1 to the same client, based on them having the same or corresponding association key "S."

In an operation S4.6 a DHCP OFFER message is sent with the allocated IP address IP, the second message key D, and the association key "S". The DHCP 48 may in another operation S4.7 computer a new shared secret "T" using an algorithm such as that disclosed previously. The DHPC 48 may in another operation S4.8 associate the allocated IP address IP2 to "T."

The DHCP 48 also updates the association key to be "T" instead of "S" so that an up-to-date association key is maintained for each subsequent request and associated with all previous IP address allocations for the same DHCP client. "S is invalidated". In other words:
Association Key "T"<->IP1<->IP2.

Responsive to receiving the DHCP OFFER message from the DHCP 48, in an operation S4.9 the DHCP client of the L3 splitter 34 computes its own shared secret "T" which should correspond to that computed by the DHCP 48. This is computed using a corresponding algorithm as that mentioned above. The shared secret "T" is stored as the updated Association key in an operation S4.10.

The DHCP client of the L3 splitter 34 may accept the DHCP OFFER in an operation S4.11 by broadcasting or otherwise sending a DHCP REQUEST message comprising the MAC address MAC2 and IP2 back to the DHCP 48. The DHCP 48 may acknowledge the acceptance in a further DHCP ACK message in an operation S4.12.

Also shown in FIG. 4 is the process of IP lease renewal, which follows the same format as before in FIG. 3. In this respect, when an entity leases an IP address from the DHCP 48, it will have an associated expiry time. Once expiry occurs, in an operation S4.13 the DHCP client of the L3 splitter 34 may send a direct unicast request for IP address renewal to the DHCP 48, including the MAC address MAC2 and the allocated IP address needing renewal, i.e. IP2. The DHCP 48 may automatically renew the lease for the IP address IP2 based on the implicit authentication of the L3 splitter 34 using MAC2 and IP2. In such a situation, an ACK message may be sent in an operation S4.14.

In some situations, the DHCP 48 may wish to allocate a different IP address in which case it may deny the lease renewal request in operation S4.14 with a NACK message. In such case, the previous steps may need to be repeated in order to acquire the new IP address. The DHCP client of the L3 splitter 34 may also be required to request a new lease if the DHCP 48 replies with the public key "D" in the DHCP NACK message.

Generally speaking, it may be noted that there is no need to exchange the secret keys "T" and hence the association chain does not need to be renewed in case the exchange fails and "T" becomes invalidated. This is particularly advantageous when multiple interfaces are activated.

Figure 5:
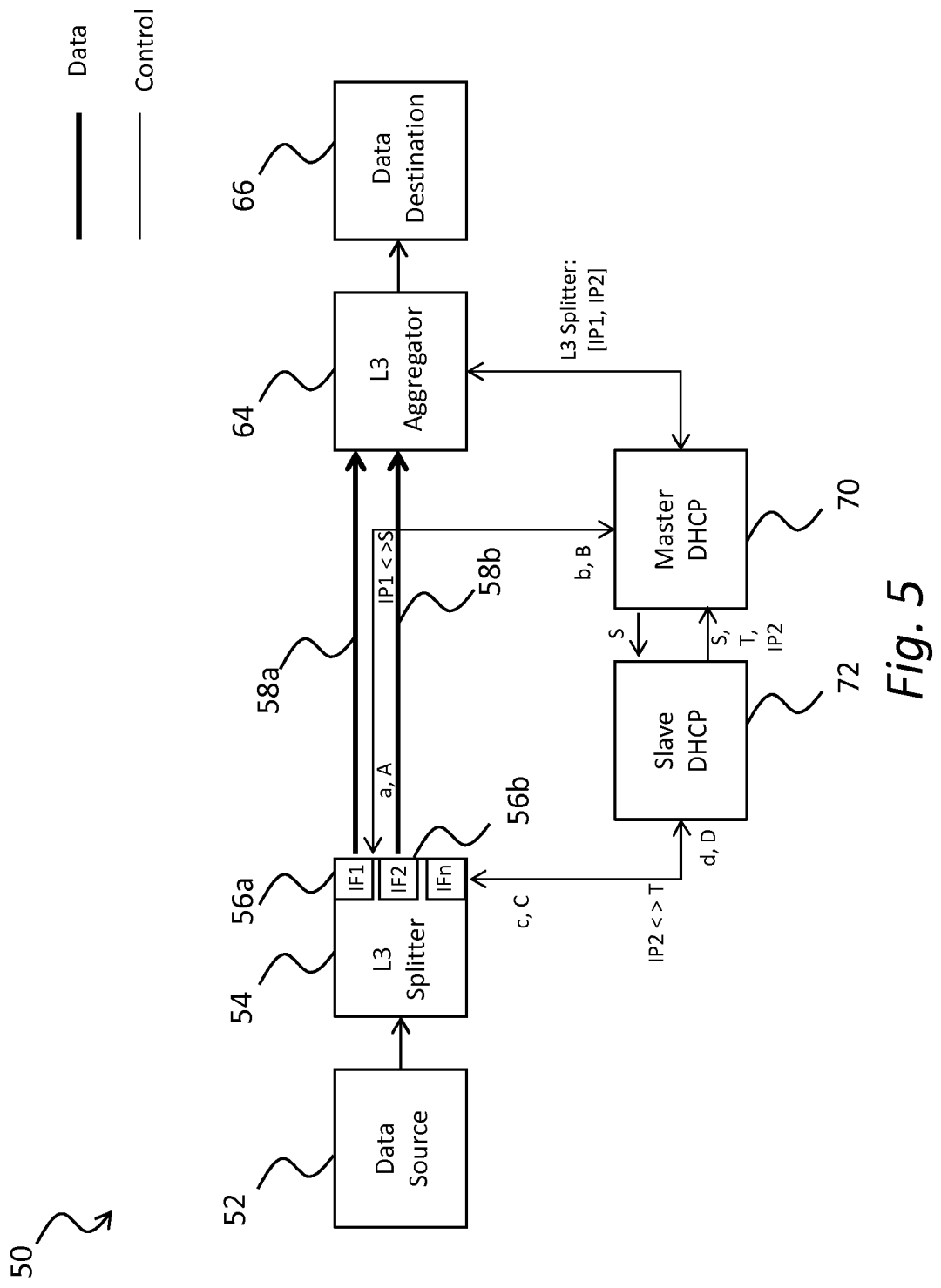
FIG. 5 is a block diagram of a multi-path network architecture according to another example embodiment.

FIG. 5 shows an example network architecture 50 according to a further embodiment. The architecture 50 comprises a data source 52, and an L3 splitter 54 having a plurality of communications interfaces 56*a*, 56*b*. The data source 52 may comprise any form of communications terminal for transmitting and/or receiving IP data packets. For example, the data source 52 may be one of a computer terminal, a mobile telephone, a smartphone, a laptop, a tablet computer or indeed any form of terminal with data communications capability. The data source 52 may be a form of customer premises equipment (CPE) or a virtual multi-X host.

The first interface 56*a* is for communicating data over a first IP sub-flow 58*a* and the second interface 56*b* is for communicating data over a second IP sub-flow 58*b* to a data destination 66. The first and second IP sub-flows 58*a*, 58*b* are independent of one another and may use different networks and/or communications technologies. The first sub-flow 58*a* may use a cellular interface 56*a* for communicating over-the-air with an eNB base station whereas the second sub-flow 58*b* may use a WiFi interface 56*b* for communicating with a local router connected to the exchange of a fixed telecommunications provider.

The data destination 66 may comprise any form of communications terminal for transmitting and/or receiving IP data packets. For example, the data destination 66 may be one of a computer terminal, a mobile telephone, a smartphone, a laptop, a tablet computer or indeed any form of terminal with data communications capability. The data destination 66 may be a form of customer premises equipment (CPE) or a virtual multi-X host.

In this architecture 50, two or more DHCPs 70, 72 may be employed which operate in collaboration.

A first DHCP 70 is a master DHCP and a second DHCP 72 is a slave DHCP. The master DHCP 7*o* is associated with the first communications interface 56*a* (MAC1), for exchanging control signals therewith, and the slave DHCP 72 is associated with the second communications interface 56*b* (MAC2), for exchanging control signals therewith. The master DHCP 70 is configured to handle key management whereby it may perform the operations described with reference to FIG. 3. The slave DHCP 72 is configured in this case to receive the association key S from the master DHCP 70 and, having knowledge of the association key S may subsequently perform the operations described with reference to FIG. 4 for allocating the IP address IP2 from the relevant pool to the second communications interface 56*b*. The slave DHCP 72 may send the allocation information back to the master DHCP 70 comprising the former association key S, the updated association key T, and the newly allocated IP address IP2. In this way, the master DHCP 70 keeps track of the allocation of IP2 to the common DHCP client associated with the data source 52. The same process may repeat for subsequent IP address allocations using the same number of DHCPs or one or more further DHCPs.

Again, the proposed embodiment is backwards compatible. Devices whose DHCP clients that do not support such protocols as outlined above may still use the above architectures above, albeit not in a way that enables faster data delivery over parallel links.

FIG. 6 is a generalised flow diagram showing processing operations that may be performed by hardware, software and/or firmware of an allocating module, e.g. the allocator 28 or DHCP 48, 70, 72 above, according to embodiments.

A first operation S6.1 comprises allocating a first IP address to a first interface of a client device. Another operation S6.2 comprises allocating a second IP address, associated with the first IP address, to a second interface of the client device. Another operation S6.3 comprises sending the allocated first and second IP addresses to an aggregating device.

FIG. 7 is a generalised flow diagram showing processing operations that may be performed by hardware, software and/or firmware of an allocating module, e.g. the allocator 28 or DHCP 48, 70, 72 above, according to more detailed embodiments.

A first operation S7.1 comprises receiving a first request from a client device identifying a first interface. Another operation S7.2 comprises providing a device-specific pool of IP addresses for the client device. Another operation S7.3 comprises allocating a first IP address from the pool to the first interface of the client device. Another operation S7.4 comprises receiving a second request from the client device identifying a second interface. Another operation S7.5 comprises allocating a second IP address from the pool to the second interface of the client device.

FIG. 8 is a generalised flow diagram showing processing operations that may be performed by hardware, software and/or firmware of a client module, e.g. the data source 12, 32, 52 or their associated splitter modules 14, 34, 54 running a DHCP client.

A first operation S8.1 comprises sending a first request for an IP address to an allocating system. Another operation S8.2 comprises receiving a first IP address from the allocating system for allocation to a first interface. Another operation S8.3 comprises sending a second request for a second IP address to the allocating system. Another operation S8.4 comprises receiving a second IP address from the allocating system for allocation to a second interface.

FIG. 9 is a generalised flow diagram showing processing operations that may be performed by hardware, software and/or firmware of an aggregating module, e.g. the aggregating module 24, 44, 64.

A first operation S9.1 comprises receiving the first and second IP addresses from the allocator module 28, 48, 70, 72, said IP addresses being indicated or advertised in control messaging as being associated with a common data flow or a common data source. The different IP addresses may be received individually in sequence or simultaneously at approximately the same time. A further operation S9.2 comprises receiving independent data sub-flows associated with the first and second IP addresses. A further operation S9.3 comprises aggregating the independent sub-flows based on the fact that the first and second IP addresses were advertised as being for a common data flow or data source. A further operation S9.4 comprises sending the aggregated data flow to the destination device.

Figure 10:
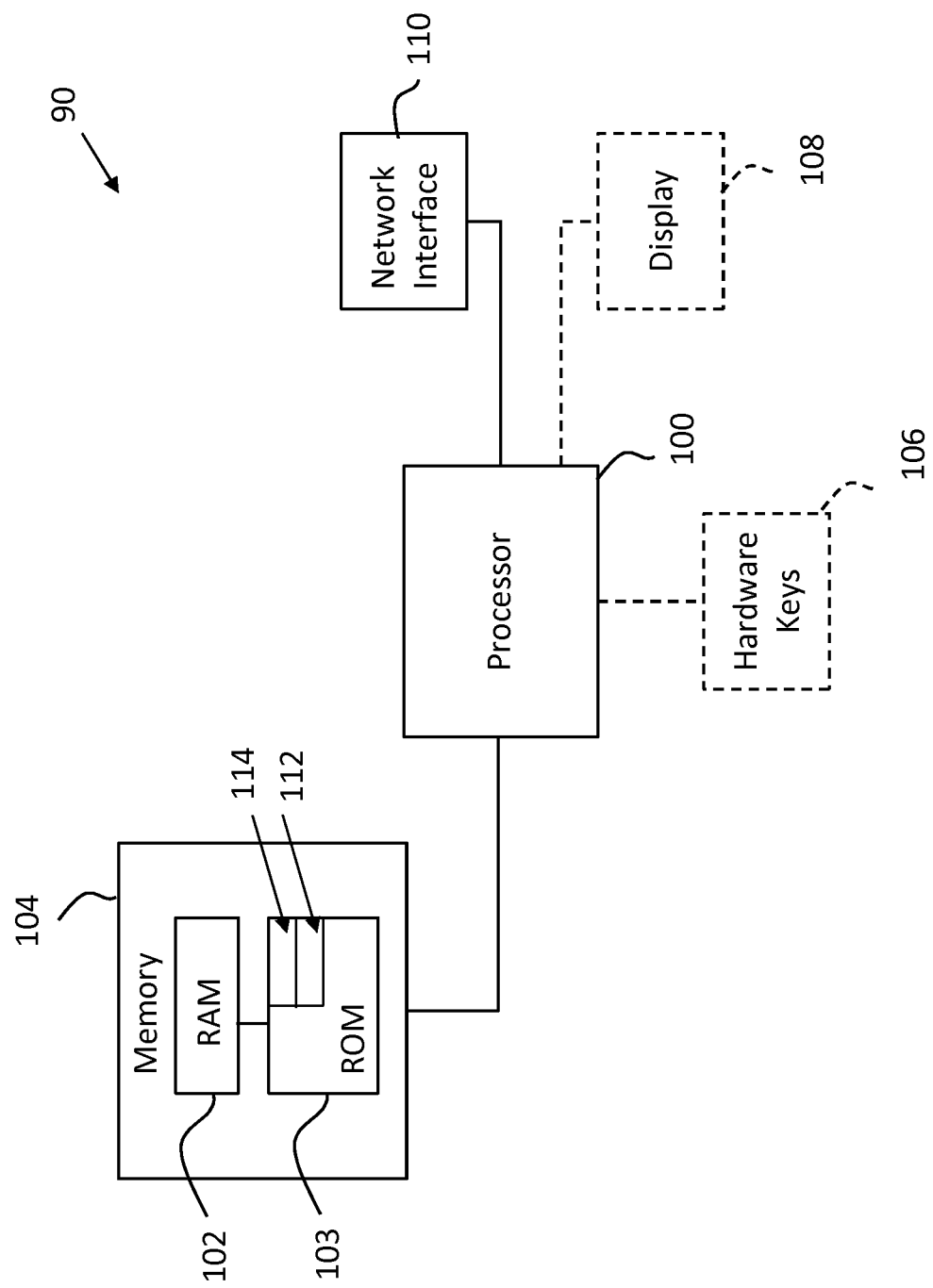
FIG. 10 is a schematic diagram of components of a processing system according to an example embodiment.

For completeness, FIG. 10 is a schematic diagram of components of one or more of the splitter, allocator or aggregator modules described previously, which hereafter are referred to generically as processing systems 90. A processing system 90 may have a processor 100, a memory 104 closely coupled to the processor and comprised of a RAM 102 and ROM 103, and, optionally, hardware keys 106 and a display 108. The processing system 90 may comprise one or more network interfaces 110 for connection to a network, e.g. a modem which may be wired or wireless.

The processor 100 is connected to each of the other components in order to control operation thereof.

The memory 104 may comprise a non-volatile memory, a hard disk drive (HDD) or a solid state drive (SSD). The ROM 103 of the memory 104 stores, amongst other things, an operating system 112 and may store software applications 114. For example, a software application 114 may comprise a DHCP client, a DHCP server or a DHCP aggregator application. The RAM 102 of the memory 104 is used by the processor 100 for the temporary storage of data. The operating system 112 may contain code which, when executed by the processor ware components of the processing system 90.

The processor 100 may take any suitable form. For instance, it may be a microcontroller, plural microcontrollers, a processor, or plural processors.

The processing system 90 may be a standalone computer, a server, a console, or a network thereof.

In some embodiments, the processing system 90 may also be associated with external software applications. These may be applications stored on a remote server device and may run partly or exclusively on the remote server device. These applications may be termed cloud-hosted applications. The processing system 90 may be in communication with the remote server device in order to utilize the software application stored there.

Figure 11:
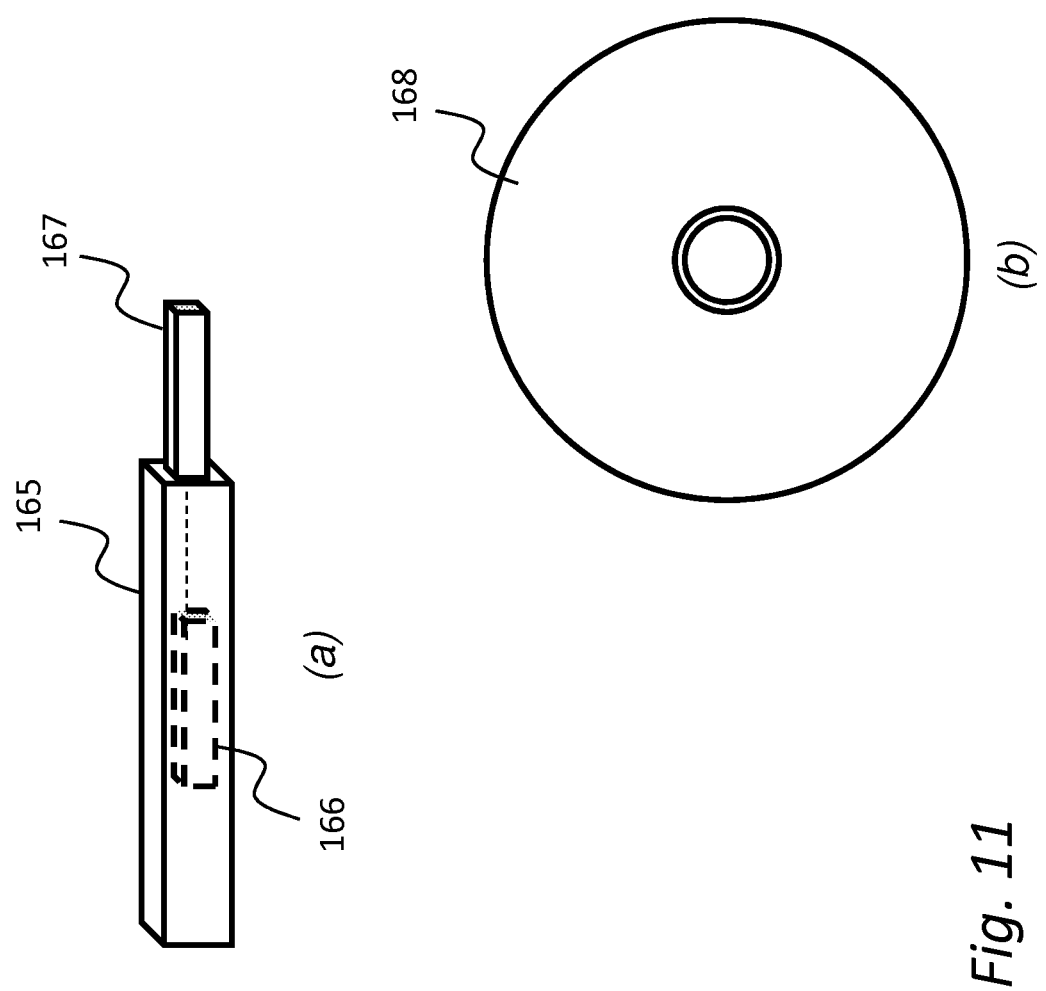
FIGS. 11*a* and 11*b* show tangible media, respectively a removable memory unit and a compact disc (CD) storing computer-readable code which when run by a computer perform operations according to embodiments.

FIGS. 11a and 11b show tangible media, respectively a removable memory unit 165 and a compact disc (CD) 168, storing computer-readable code which when run by a computer may perform methods according to embodiments described above. The removable memory unit 165 may be a memory stick, e.g. a USB memory stick, having internal memory 166 storing the computer-readable code. The memory 166 may be accessed by a computer system via a connector 167. The CD 168 may be a CD-ROM or a DVD or similar. Other forms of tangible storage media may be used.

In overview, methods and systems are described for enabling multi-path communications over networks based on allocating IP addresses from a pool of device-specific IP addresses, and advertising said device-specific IP addresses to an aggregating module, which may handle tasks such as traffic balancing. The aggregating module may thereafter determine which IP addresses are associated with which devices and aggregate the data sub-flows accordingly. The use of DHCP is provided as an example basis of the control protocol, which enables it to be backwards compatible and requires only two new DHCP options; DHPC was intentionally designed to be modular and extensible, hence adding DHCP requires no new standardization.

The pool from which device-specific IP addresses may be allocated may have the form of a transitive chain of IP addresses characterized by a device-specific association key, i.e. there is a mapping of:

Association key <->IP1<->IP2<-> . . . Ipn for each client device. Each client device need only store the association key and keep track of interfaces that have joined the association. The aggregator, or traffic management entity, may be given the association descriptor, e.g.

Association key <-> <IF1, IP1><-> <IF2, IP2> <-> . . . <IFn, Ipn> from which it can derive relationships for any two IP 5-tuples, which is a pre-requisite for layer 3 multi-path traffic management.

The association key is a shared secret between the DHCP server and the device. Standard schemes such as Diffie-Hellman algorithms may be used to securely update the association key in both the client device and the DHCP server anytime a new IP address is assigned to a new interface. In this way, malicious network users may be prevented from associating their own IP and MAC addresses with other users or devices in such a way that traffic may be hijacked. The shared secret may be encoded in some form.

In the above, the sending of the first and second (and any subsequent) IP address to the client device may be performed directly or indirectly, e.g. using indirect address referencing.

In the above, the pool of IP addresses can be an a prior allocation of IP addresses, or alternatively created on-the-fly, for example based on an algorithm that implicitly dictates the resulting IP address pool.

It will be appreciated that the above described embodiments are purely illustrative and are not limiting on the scope of the invention. Other variations and modifications will be apparent to persons skilled in the art upon reading the present application.

Moreover, the disclosure of the present application should be understood to include any novel features or any novel combination of features either explicitly or implicitly disclosed herein or any generalization thereof and during the prosecution of the present application or of any application derived therefrom, new claims may be formulated to cover any such features and/or combination of such features.

The invention claimed is:

1. A method comprising:
    allocating a first IP address to a first interface of a client device for data communications using a first sub-flow over a first path;
    allocating a second IP address to a second interface of the client device for data communications using a second sub-flow over a second, different path, the second IP address being associated with the first IP address and allocated from a pool of IP addresses specific to the client device; and sending information relating to the allocated first and second IP addresses for the client device to an aggregating device for aggregating the first and second sub-flows, when received from the client device, for providing aggregated data to a destination device.

2. The method of claim 1, further comprising allocating one or more further IP addresses to respective further interfaces of the client device for data communications using respective further sub-flows over respective different paths, the further IP addresses being associated with the first and second IP addresses, and sending information relating to the further IP addresses for the client device to the aggregating device.

3. The method of claim 1, wherein the first IP address is allocated responsive to a first request from the client device, and the second IP address is allocated responsive to a second request from the client device, the method further comprising identifying, or deriving, an association key from the second request, which association key identifies or generates the device-specific pool of IP addresses from which the second IP address is allocated.

4. The method of claim 3, further comprising generating a first association key responsive to the first request and sending information to the client device for the client device to generate a corresponding first association key identifiable or derivable from the second request from the client device.

5. The method of claim 4,
wherein the first association key is generated by:
receiving a public key A from the client device;
computing a local public key B; and
generating a local first association key S based on the received public key A and the local public key B.

6. The method of claim 5, wherein the public key A is received from the client device with an identifier of the first interface of the client device, the method further comprising associating the first IP address with the first interface identifier.

7. The method of claim 6, further comprising:
sending the local public key B to the client device for generating a comparison first association key S.

8. The method of claim 3, further comprising, responsive to receiving the second request, generating a second association key, linked to the first association key, and sending information to the client device for the client device to generate a corresponding second association key identifiable or derivable from a subsequent request from the client device.

9. The method of claim 8,
wherein the second association key is generated by:
receiving the first association key S and a new public key C from the client device;
identifying a correspondence between the local first association key S and the received first association key S;
computing a new public key D; and
generating a local second association key T, linked to the first association key S based on the received public key C and the local public key D.

10. The method of claim 9, wherein the public key C is received from the client device with an identifier of the second interface of the client device, the method further comprising associating the second IP address with the first interface identifier.

11. The method of claim 8, further comprising, responsive to receiving a further request, generating a further association key, linked to the first and second association keys, and sending information to the client device for the client device to generate a corresponding further association key to the client device identifiable or derivable from a subsequent request from the client device.

12. A method comprising:
at a client device comprising first and second interfaces:
sending a first request for a first IP address to an allocating system;
receiving information relating to a first IP address from the allocating system, the first IP address being allocated to the first interface for data communications using a first sub-flow over a first path;
sending a second request for a second IP address to the allocating system;
receiving information relating to the second IP address from the allocating system, the second IP address being allocated to the second interface for data communications using a second sub-flow over a second path and the second IP address being allocated from a pool of IP addresses specific to the client device.

13. The method of claim 12, further comprising:
sending one or more further requests for respective further IP addresses to the allocating system;
receiving information relating to one or more respective IP addresses from the allocating system, the IP addresses being allocated to respective further interfaces for data communications using further sub-flows over further paths.

14. The method of claim 12, wherein the second request comprises an association key.

15. The method of claim 14, wherein a first association key is generated in response to a message from the allocating device in response to the first request.

16. The method of claim 15, further comprising, responsive to sending the second request, receiving information for generating a second association key, linked to the first association key, in a message from the allocating device.

17. The method of claim 14,
wherein the first association key is generated by:
receiving a public key B from the allocating device; and
generating a comparison first association key S based on a computed local public key A and the received public key B.

18. The method of claim 12, wherein the first IP address is allocated responsive to the first request from the client device and wherein the device-specific pool of IP addresses comprises a chain of one or more further IP addresses, associated with the first IP address.

19. The method of claim 12, wherein one or more of the first and second IP addresses have an associated expiry time, the method further comprising sending a renewal request to the allocating device comprising at least one of the first and second IP addresses.

20. An apparatus, the apparatus having at least one processor and at least one memory having computer-readable code stored thereon which when executed controls the at least one processor:
to allocate a first IP address to a first interface of a client device for data communications using a first sub-flow over a first path;
to allocate a second IP address to a second interface of the client device for data communications using a second sub-flow over a second, different path, the second IP address being associated with the first IP address and the second IP address being allocated from a pool of IP addresses specific to the client device; and to send information relating to the allocated first and second IP addresses for the client device to an aggregating device for aggregating the first and second sub-flows, when received from the client device, for providing aggregated data to a destination device.

\* \* \* \* \*